3,031,514
ALKYLATION WITH SUPPORTED CATALYST COMPLEX

Milton Kosmin, Dayton, Ohio, assignor to Monsanto Chemical Company, St. Louis, Mo., a corporation of Delaware
No Drawing. Filed Dec. 20, 1957, Ser. No. 704,001
5 Claims. (Cl. 260—671)

The present invention relates to catalyst of use in organic reactions and more particularly provides a new and valuable catalyst comprising a complex of certain metal alkyls and certain metal halides deposited on a solid aluminiferous material, the method of preparing the new catalyst, and methods of converting hydrocarbons in which the new catalyst is employed.

An object of the invention is to provide an improved catalyst for use in such hydrocarbon conversion processes as alkylation of paraffinic or aromatic hydrocarbons with alkyl halides or olefins, the isomerization of saturated hydrocarbons, the rearrangement or disproportionation of alkylaromatic hydrocarbons and the polymerization of unsaturated hydrocarbons.

The above types of reactions have been generally conducted in the prior art by the use of Friedel-Crafts type metal halide catalysts, e.g., anhydrous aluminum chloride, zinc chloride or ferric chloride or other acidic materials such as sulfuric acid, hydrofluoric acid or boron trifluoride. These catalysts generally have the disadvantage of either being so active that they give rise to difficultly resolvable complexes and sludges, or of being so weak that operations based on their use are not economically feasible. Also, most of the prior Friedel-Crafts type catalysts are so volatile that their use is necessarily limited to liquid phase reactions; others are so insoluble that operation in the presence of an extraneous solvent or diluent such as carbon tetrachloride is required.

Now I have found that either liquid phase or vapor phase hydrocarbon conversion processes are efficiently catalyzed, while prior art difficulties are essentially minimized, by employing as the catalyst a complex reaction product deposited on a solid particulate aluminiferous material, said catalyst having been prepared by reacting together in the presence of the aluminiferous material and in the substantial absence of water and oxygen vapor a metal halide selected from the class consisting of the halides of the transition metals of groups IV to VIII of the periodic system and a metal alkyl compound obtained by replacing in the halide of a metal of groups I–III of the periodic system at least one halogen atom by an alkyl radical of 1 to 5 carbon atoms. While the nature of the catalyst thus obtained is not completely understood, it is believed to be a product in which, under the influence of the solid aluminiferous material, the metal alkyl has reacted with the metal halide while reducing the oxidation state of either one or both of the participating metals.

Examples of solid aluminiferous materials useful for the present purpose are activated alumina, partially dehydrated aluminum oxide, bauxite, kaolin, manufactured supports such as Porocel, saddle packing, pipe clay, etc.

The useful metal halides include the chlorides, bromides, iodides and fluorides of e.g., titanium, zirconium, hafnium, vanadium, niobium, tantalum, chromium, molybdenum, manganese, tungsten, iron, cobalt, nickel, ruthenium, palladium and platinum such as titanium tri- or tetrachloride; titanium tri- or tetrabromide; zirconium tri- or tetrafluoride; zirconium tri- or tetrachloride; vanadium di-, tri- and tetrachloride; canadium trifluoride; chromous or chromic chloride; molybdenum di-, tri-, tetra- or pentachloride; tungsten di-, tetra-, penta- or hexachloride; ferric bromide, chloride or fluoride; ferrous chloride, iodide or bromide; cobaltous or cobaltic chloride; nickel chloride, bromide or fluoride; platinic or platinous chloride or bromide, etc.

The useful metal alkyl compounds have the formula $$MeX_nY_{m-n}$$

wherein Me denotes a metal of groups I–III of the periodic system, X is halogen, Y is an alkyl radical of from 1 to 5 carbon atoms, $n$ is a number which may have a value of 0 up to that which is less by one than the valency of said metal, $m$ is a number of from 1 to that which is the valency of said metal and the sum of $m+n$ is the valency of said metal. As hereinbefore stated, the metal alkyl compound can thus be characterized as one in which there has been replaced in the halide of a metal of groups I–III of the periodic system at least one halogen by an alkyl radical of from 1 to 5 carbon atoms. Thus, there may be employed the alkyl-substitution products of aluminum, e.g., the trialkyl aluminum compounds such as trimethyl, triethyl, triisopropyl, tri-n-butyl or tri-n-amyl aluminum; the dialkyl aluminum monohalides such as diethyl aluminum monochloride, di-n-propyl aluminum monobromide or di-n-butyl aluminum chloride; the monoalkyl aluminum dihalides such as n-butyl aluminum dichloride or dibromide, etc. While for reasons of easy manipulation and optimum catalyst efficiency I prefer to use the aluminum compounds, I may use metal alkyls wherein the metal is another member of groups I–III of the periodic system, e.g., the lithium, zinc, strontium, magnesium, or cadmium alkyls such as n-butyl or ethyl lithium; dimethyl zinc or n-amyl zinc chloride; di-n-propyl magnesium or tert-butyl magnesium chloride, diethyl cadmium or isopropyl cadmium bromide, etc. For the sake of convenience, hereinafter both the halogen-containing and the halogen-free alkyl compounds will be referred to simply as "metal alkyls."

According to the invention the metal halide-metal alkyl complex is formed in situ upon the solid aluminiferous support or carrier. This may be done by introducing an intimate mixture of the support material and one of the complex components into a reaction zone, and treating the resulting mixture with the other component at either ordinary or increased temperatures, depending upon the reactivity of the individual reactants. Thus, an aluminiferous solid support, such as a substantially anhydrous alumina in particulate or comminuted form, is mixed with a metal halide, say, zirconium tetrachloride, and the resulting mixture is treated with a solution of a metal alkyl such as diethyl aluminum chloride in an inert solvent, e.g., hexane. Conversely, the metal alkyl, e.g., a solution or suspension of tri-n-amyl aluminum in an inert solvent, is added to a suspension of the comminuted aluminiferous support, in an inert liquid which is advantageously a non-solvent for the metal alkyl, and the metal halide is introduced into the resulting suspension of supported metal alkyl, e.g., by passing the volatilized halide into the suspension. Since the metal halides are generally moisture-susceptible and the metal alkyls very readily oxidizable, it is necessary, of course, that the reaction be effected under substantially anhydrous conditions and in the substantial absence of oxygen.

Depending upon the nature of the individual metal halide and the metal alkyl, external heating may or may not be required for complex formation. As hereinbefore stated, the presence of the aluminiferous support appears to catalyze complex formation, whereby reaction of the halide with the alkyl is often exothermic. Complex formation is generally evidenced by a notable color change in the reaction mixture: application of heat is recommended in instances where no reaction is perceptible upon prolonged contact of the metal alkyl with the metal halide. Inasmuch as reaction of the alkyl with the halide is readily followed, optimum temperature for each pair of reactants are easily ascertained by simple experimental procedure.

When formation of the supported complex is effected in an inert liquid diluent or suspending medium, the resulting catalyst may be recovered by filtration. Conveniently the suspending agent may be one of the hydrocarbons employed as a reactant in the hydrocarbon conversion process for which the supported catalyst complex is to be employed. Thus when intended for use in the alkylation of benzene or an aromatic hydrocarbon, the catalyst may be prepared by suspending the comminuted support in the aromatic hydrocarbon, and then adding the complex-forming metal halide and metal alkyl to the suspension.

Inasmuch as the present supported complex is a highly efficient catalyst, the proportion of metal halide to metal alkyl which is employed for preparing the complex is relatively unimportant, since the presence of even a very small quantity of the complex on the aluminiferous support will serve as catalyst. Any unreacted metal halide or metal alkyl which deposits on the support apparently has no undesirable effect on the catalytic activity of the complex. For purposes of economy, of course, it is advantageous to employ the metal halide with the metal alkyl in stoichiometric proportion, one mole of the halide reacting with one mole of the alkyl to form the complex. With respect to ratio of complex to support, it is advantageous that there be introduced enough metal halide and enough metal alkyl to provide for a deposit of complex upon the support which is equivalent to at least 0.01 percent by weight of the support material. Also, since it has been found that thin layers of the complex on the support give optimum catalytic activity, it is recommended that metal halide and metal alkyl quantities be so regulated that the upper limit of complex in the finished catalyst not substantially exceed, say, 50 percent by weight of the support material.

For use in vapor phase reactions, the present supported catalyst may be conveniently prepared in apparatus, e.g., a tubular reactor or tower, which is adapted to vapor phase reactions. Such an apparatus will suitably comprise one or more inlets through which the charge stock is introduced and an exit from which the product is conveyed, advantageously through a condenser to a receiver unit. Depending upon the type of reactor, the catalyst is positioned therein either in a single layer or in a number of suitably spaced beds. When using the catalyst in vapor phase alkylations, isomerizations, or polymerizations, exit gases may be recycled with fresh stock for conversion of residual reactive material present in the product. The vapor phase reactions, depending upon the nature of the individual reactants and products desired may be conducted at ordinary or increased temperatures and at ordinary or superatmospheric pressures.

When employing the supported complex in liquid phase reactions, the solid aluminiferous material with its deposit is simply dispersed or suspended in at least one of the reactants and reaction is effected at ordinary or increased temperature at pressures which may be ordinary or superatmospheric pressures. When employed in alkylation reactions wherein, contrary to the situation which generally obtains in isomerizations and polymerizations, more than one reactant is used, the catalyst may be immersed in a liquid reactant and the other reactant is subsequently added thereto while maintaining the temperature of the reaction mixture at the optimum point. This is particularly convenient when one of the reactants is gaseous, for instance in reactions such as the ethylation of benzene with ethylene or the isopropylation of diphenyl with propylene.

Liquid phase reactions wherein the present catalyst is used may be continuous or batch-wise. When operating batch-wise the reactant or reactants are maintained in contact with the catalyst at experimentally determined optimum temperatures and pressures until reaction has been substantially completed, and the product removed from the catalyst, e.g., by decanting or filtering. In continuous operation, the product, as it is formed, is continuously removed from the reactor while feeding additional reactant stock and/or catalyst to the reactor.

Polymerization of such lower aliphatic olefins as ethylene or propylene or mixtures of the same to obtain solid polymers may be effected in the vapor phase whereby the gaseous charge stock is polymerized as it travels through the catalyst-filled reaction zone and the issuing polymers passed into a non-solvent from which the polymeric products precipitate. Polymerization may also be effected by passing the gaseous polymer over a bed of the present supported catalyst and collecting the resulting polymer on the catalyst bed from which it is readily leached out. Conveniently also, the polymerization may be effected by passing the lower aliphatic olefin into an inert liquid wherein the present catalyst is suspended or dispersed. When such an inert liquid, say, ethanol or ether, is a non-solvent for the polymer product, the polymer precipitates out and forms an easily decanted upper layer. On the other hand, when the liquid medium is a solvent for the polymeric product, the resulting solution of polymer is decanted from the lower catalyst layer, and the polymer recovered from the decanted solution simply by evaporating off the solvent or by precipitation from a non-solvent.

While the present supported complex catalyst is useful in catalyzing hydrocarbon conversion processes generally, it is most advantageously employed when an olefin containing hydrocarbon feed is employed, e.g., in alkylation of an aromatic hydrocarbon having a replaceable nuclear hydrogen atom with an aliphatic mono-olefin or in the polymerization of aliphatic mono-olefinic hydrocarbons.

As herein stated, such reactions take place either in the liquid or vapor phase; hence operation within broad temperature ranges, say, at temperatures of from 30° C. to 300° C. is feasible.

Other examples of uses for which the present supported complex catalyst is eminently suited are shown in the following examples which, while giving detailed directions for preparation of the catalyst and its application in hydrocarbon conversion processes, are included herewith only by way of additional illustration and not for the purpose of limiting the invention.

*Example 1*

An alumina support was prepared by washing 300 g. of alumina (14–28 mesh, grade F–1, trade named "Alcoa") with 5% aqueous hydrochloric acid, washing with water, drying in an autoclave at 360° C./2 mm. for 18 hours, and allowing it to cool to room temperature in an atmosphere of lamp-grade nitrogen.

A portion (86.2 g.) of the cooled alumina was transferred to a 1-liter, 4-neck flask containing 1113 ml. of hexane and equipped with Teflon blade stirrer, gas inlet tube, thermometer and condenser attached to a mineral oil bubbler. To the rapidly stirred suspension there was added 6.3 g. (0.032 mole) of triisobutyl aluminum in 100 ml. of hexane; and 30 minutes later, 22.7 g. (0.199 mole) of titanium tetrachloride in 100 ml. of hexane. A total temperature rise of 6° C. was noted. A reaction appeared to take place on the surface of the alumina, turning it brown, while the hexane solution became orange. The solution was decanted and the residual treated alumina, hereinafter referred to as the catalyst, was washed twice with 150 ml. portions of fresh hexane.

The hexane-damp catalyst was suspended in dry benzene and the resulting mixture was heated to 55° C. under a blanket of nitrogen. Propylene was then passed into the stirred mixture through a Rotameter at a temperature of 68° C.–78° C. for 1.7 hours. During this time a total of 85.9 g. of propylene had been absorbed.

The catalyst was removed from the resulting colorless reaction mixture by decantation, then washed with ether and the washings combined with the decanted liquid. After washing the combined product was aqueous bicarbonate, drying over magnesium sulfate and filtering, two-thirds of the filtrate was distilled to give 91.4 g. of unreacted benzene, 67.9 g. of cumene, 82.3 g. of a mixture of di- and tri-isopropylbenzenes and 3.1 g. of 1,2,4,5-tetra-isopropylbenzene.

*Example 2*

A supported catalyst was prepared as follows:

To another 82.2 portion of the alumina support which was prepared in Example 1, there was added 100 ml. dry hexane and 7.5 g. triisobutyl aluminum in 125 ml. of hexane. After stirring the resulting suspension for a few minutes there was added to it 32.8 g. of titanium tetrachloride in 125 ml. of hexane. Formation of a brown precipitate was noted. The alumina, with its deposit, was separated by decanting and then washed with dry hexane.

The catalyst thus prepared was used in a polymerization process by passing propylene into a suspension of the catalyst for about 3 hours at a temperature of 68°–75° C. At the end of that time the catalyst was separated from the reaction mixture and the white, jelly-like precipitate which had formed in the residual liquor was filtered off and dried at 40° C. to give a tough, solid, colorless, polymeric propylene.

While the above examples show only use of the present catalyst for the alkylation of benzene and for the polymerization of propylene, it is to be understood, of course that the invention is not restricted to such uses. Nuclear alkylation of aromatic hydrocarbons, generally, is catalyzed by the supported complex catalyst. Thus, instead of using benzene or cumene as the aromatic component, there may be employed, e.g., ethylbenzene, o-, m- or p-xylene, tert-amylbenzene, dodecylbenzene, naphthalene, $\alpha$-methylnaphthalene, biphenyl, 4,4'-diisopropylbiphenyl, diphenylethane, etc. Also instead of using propylene as the alkylating agent olefin there may be employed other aliphatic mono-olefins, e.g., ethylene, 2-butene, 1-pentene, 2-hexene, 2,3-dimethyl-2-butene, 1-decene, and the lower polymeric olefins such as propylene trimer or tetramer or butylene dimer or trimer. Instead of employing an olefin as an alkylating agent, other alkylating agents may be used, e.g., alkyl halides such as ethyl, n-butyl or 2-ethylhexyl chloride, bromide or iodide. Partially chlorinated paraffins such as kerosene are alkylating agents which may be used to give commercially important products. While, depending upon the nature of the individual reactants there will be some variation in operating conditions, such variations will be those to be expected by those skilled in the art. Thus, the highly active alkyl chlorides such as tert-butyl or tert-amyl chloride will not require, in alkylation reactions, the more stringent conditions of temperature, time and catalyst concentration which are required for a less active alkyl halide such as methyl chloride. Similarly, the use of an active aromatic compound such as toluene, (2-ethylhexyl)benzene or naphthalene will require less stringent conditions than will be required when working with benzene. When employing such less reactive components, the present supported catalyst may comprise as much as 50% by weight of metal halide or metal alkyl complex reaction product. The proportion of said complex reaction product, however, based on the alkylation reactants, will be within catalytic amounts, say, up to 5% by weight, based on the weight of the aromatic component.

As hereinbefore stated, the supported complex catalyst of the present invention is a highly useful catalyst for hydrocarbon conversion processes, generally. It is advantageously employed, e.g., in alkylation of isoparaffins or naphthenes with aliphatic mono-olefins to give motor fuels; isomerization processes wherein the straight chain paraffinic content of a liquid petroleum hydrocarbon is converted partially, at least to branched structures; cracking of paraffinic hydrocarbons; rearrangement of alkyl-aromatics, and polymerization of mono-olefinic hydrocarbons such as ethylene, propylene, 2-butene and styrene or mixtures of one or more olefins.

What I claim is:

1. The method of alkylating with an olefin a normally liquid aromatic hydrocarbon having a replaceable nuclear hydrogen to obtain an alkyl-substituted aromatic hydrocarbon wherein the carbon content of the alkyl radical is the same as that of the olefin, which comprises reacting an aliphatic mono-olefin with said hydrocarbon in the presence of up to 5.0% by weight, based on the weight of the hydrocarbon, of a solid catalyst prepared by introducing, in the substantial absence of water and oxygen, (I) a titanium halide and (II) an alkyl aluminum compound of the formula $AlX_n Alkyl_{3-n}$ where X is halogen and $n$ is an integer of 0 to 2, to (III) a suspension of a finally comminuted aluminiferous material in an inert diluent, until there has been deposited on the aluminiferous material a quantity of a 1:1 molar complex of the titanium halide and the aluminum compound which is from 0.01% to 50% by weight of the weight of alumina, and separating the liquid phase from the resulting reaction mixture for recovery of the solid catalyst.

2. The method of claim 1, further characterized in that the liquid aromatic hydrocarbon is benzene.

3. The method of alkylating benzene with an olefin which comprises reacting the benzene with an aliphatic mono-olefin to obtain an alkyl-substituted benzene in which the carbon content of the alkyl radical is the same as that of the olefin in the presence of up to 5.0% by weight, based on the weight of the benzene, of a solid catalyst prepared by introducing, in the substantial absence of water and oxygen, (I) titanium tetrachloride in an inert diluent and (II) a trialkyl aluminum in an inert diluent and having from 1 to 5 carbon atoms in the alkyl radical, to (III) a suspension of a finely comminuted aluminiferous material in an inert dilent, until there has been deposited on the aluminiferous material a quantity of a 1:1 molar complex of the titanium tetrachloride and the trialkyl aluminum which is from 0.01% to 50% by weight of the weight of the aluminiferous material and separating the liquid phase from the resulting reaction mixture for recovery of the solid catalyst.

4. The method of propylating benzene which comprises reacting benzene with propylene in the presence of up to 5.0% by weight, based on the weight of the benzene, of a solid catalyst prepared by introducing, in the substantial absence of water and oxygen, (I) titanium tetrachloride in an inert diluent and (II) a trialkyl aluminum in an inert diluent and having from 1 to 5 carbon atoms in the alkyl radical, to (III) a suspension of a finely comminuted aluminiferous material in an inert diluent, until there has been deposited on the aluminiferous material a quantity of a 1:1 molar complex of the titanium tetrachloride and the trialkyl aluminium which is from 0.01% to 50% by weight of the weight of the aluminiferous material, and separating the liquid phase from the resulting reaction mixture for recovery of the solid catalyst.

5. The method of propylating benzene which comprises reacting benzene with propylene in the presence of up to 5.0% by weight of a solid catalyst prepared by introducing, in the substantial absence of water and oxygen, (I) titanium tetrachloride in an inert diluent and (II) a solution of tributyl aluminum in an inert solvent to (III) a suspension of finely comminuted alumina in an inert diluent until there has been deposited on the alumina a quantity of a 1:1 molar complex of the titanium tetrachloride and the tributyl aluminium which is from 0.01% to 50% by weight of the weight of the alumina, and separating the liquid phase from the resulting reaction mixture for recovery of the solid catalyst.

References Cited in the file of this patent

UNITED STATES PATENTS

| | | |
|---|---|---|
| 2,824,089 | Peters et al. | Feb. 18, 1958 |
| 2,824,145 | McCall | Feb. 18, 1958 |
| 2,827,446 | Breslow | Mar. 18, 1958 |
| 2,843,577 | Friedlander | July 15, 1958 |

FOREIGN PATENTS

| | | |
|---|---|---|
| 534,792 | Belgium | Jan. 31, 1955 |

OTHER REFERENCES

"Polyethylene," Raff et al., published by Interscience Publishers, Inc., New York 1956 (pages 66–71 relied on).